Figure 1:
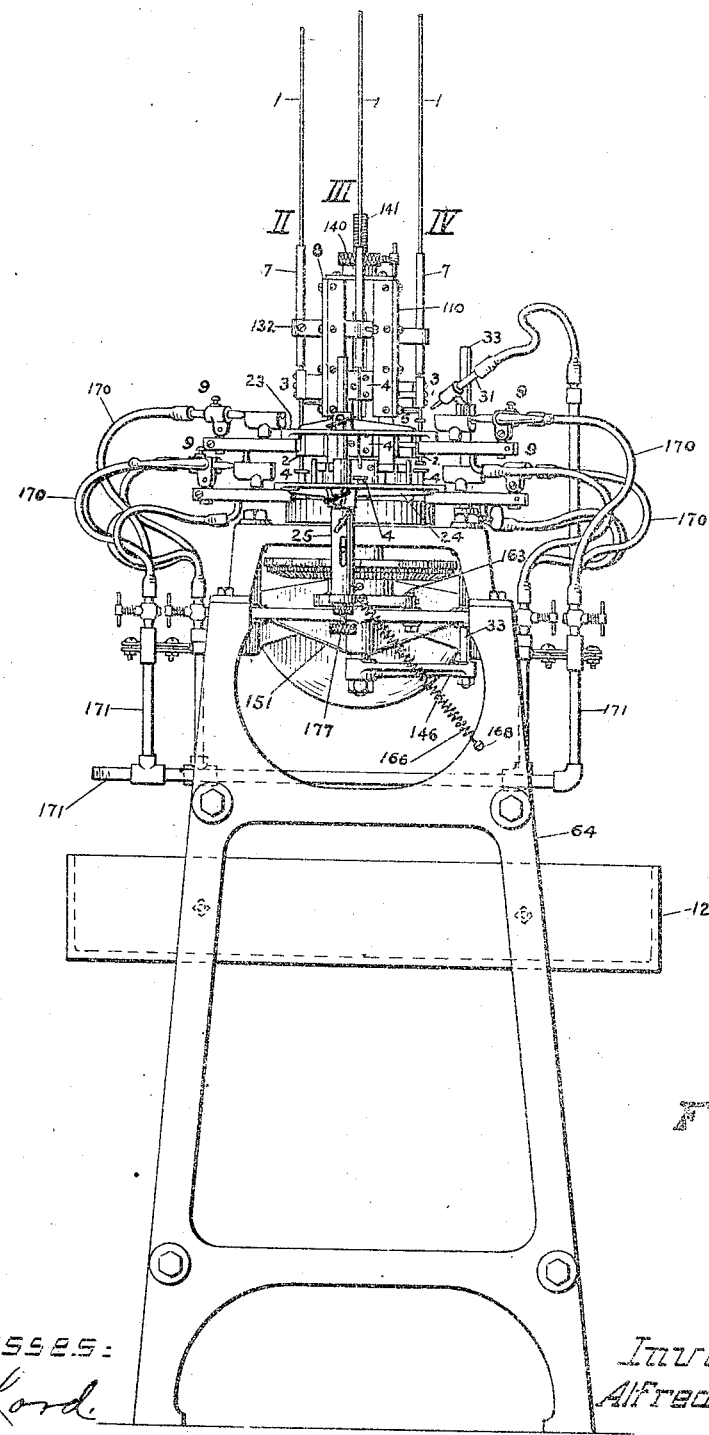

A. LA FRANCE.
GLASS WORKING MACHINERY.
APPLICATION FILED JUNE 22, 1912.

1,165,884.

Patented Dec. 28, 1915
9 SHEETS—SHEET 1.

Witnesses:
A. L. Lord.
Helen Oxford

Inventor.
Alfred LaFrance
by
Attorney.

A. LA FRANCE.
GLASS WORKING MACHINERY.
APPLICATION FILED JUNE 22, 1912.

1,165,884.

Patented Dec. 28, 1915.
9 SHEETS—SHEET 4.

WITNESSES
Allan V. Clarke
Helen Orford

INVENTOR.
ALFRED LA FRANCE,
BY
ATTORNEY.

A. LA FRANCE.
GLASS WORKING MACHINERY.
APPLICATION FILED JUNE 22, 1912.

1,165,884.

Patented Dec. 28, 1915.
9 SHEETS—SHEET 6.

Witnesses:
J. L. Lord
Helen Oxford

Inventor.
Alfred La France,
by Albert G. Davis
Attorney.

A. LA FRANCE.
GLASS WORKING MACHINERY.
APPLICATION FILED JUNE 22, 1912.

1,165,884.

Patented Dec. 28, 1915.
9 SHEETS—SHEET 7.

Witnesses:

Inventor.
Alfred La France,
by
Attorney.

A. LA FRANCE.
GLASS WORKING MACHINERY.
APPLICATION FILED JUNE 22, 1912.

1,165,884.

Patented Dec. 28, 1915.

Witnesses:
A. L. Lord.
Helen Oxford

Inventor.
Alfred La France,
by
Attorney.

A. LA FRANCE.
GLASS WORKING MACHINERY.
APPLICATION FILED JUNE 22, 1912.

1,165,884.

Patented Dec. 28, 1915.

Witnesses
A. L. Lord.
Helen Oxford

Inventor.
Alfred La France,
by Albert H. Davis
Attorney.

UNITED STATES PATENT OFFICE.

ALFRED LA FRANCE, OF CENTRAL FALLS, RHODE ISLAND, ASSIGNOR TO GENERAL ELECTRIC COMPANY, A CORPORATION OF NEW YORK.

GLASS-WORKING MACHINERY.

1,165,884.   Specification of Letters Patent.   Patented Dec. 28, 1915.

Application filed June 22, 1912. Serial No. 705,201.

*To all whom it may concern:*

Be it known that I, ALFRED LA FRANCE, a citizen of the United States, residing at Central Falls, county of Providence, State of Rhode Island, have invented certain new and useful Improvements in Glass-Working Machinery, of which the following is a specification.

My invention relates to the working of glass and the like and to the formation of enlargements or buttons on rods or tubes of glass and other materials.

One of the principal objects of my invention is to make possible the production of such buttons in a practical, convenient, and cheap way, and upon a commercial scale; but various other advantages obtainable through my invention will hereinafter become apparent.

My invention comprises mechanism adapted for the working of glass which is capable of automatic operation in an efficient and economical manner.

I have hereinafter described an automatic glass working machine with particular reference to its employment in the production of short solid glass rods carrying a number of suitably spaced buttons, such as are employed for the filament supporting frames or spiders of commercial types of metal filament incandescent lamps. While, however, the particular mechanism shown and described represents the best embodiment of the invention at present known to me, and while the invention extends to many of its specific features and details, which are of importance because of their specific advantages, yet the invention is not confined to this machine and its details, but can be otherwise carried out and applied, and can be embodied in other forms of mechanism comprising various features of operation and construction, combination and arrangements of parts, and special devices and mechanisms such as are covered by my claims.

Figure 2:
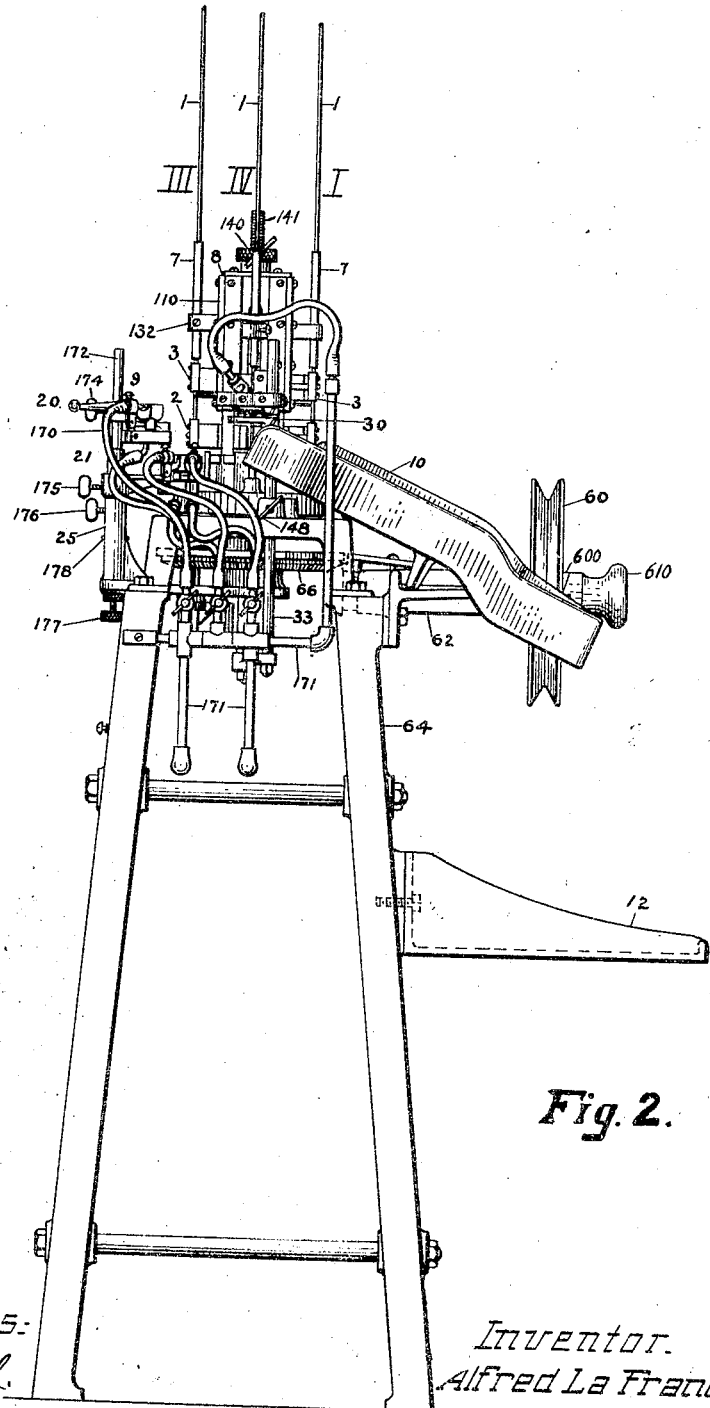
Figure 3:
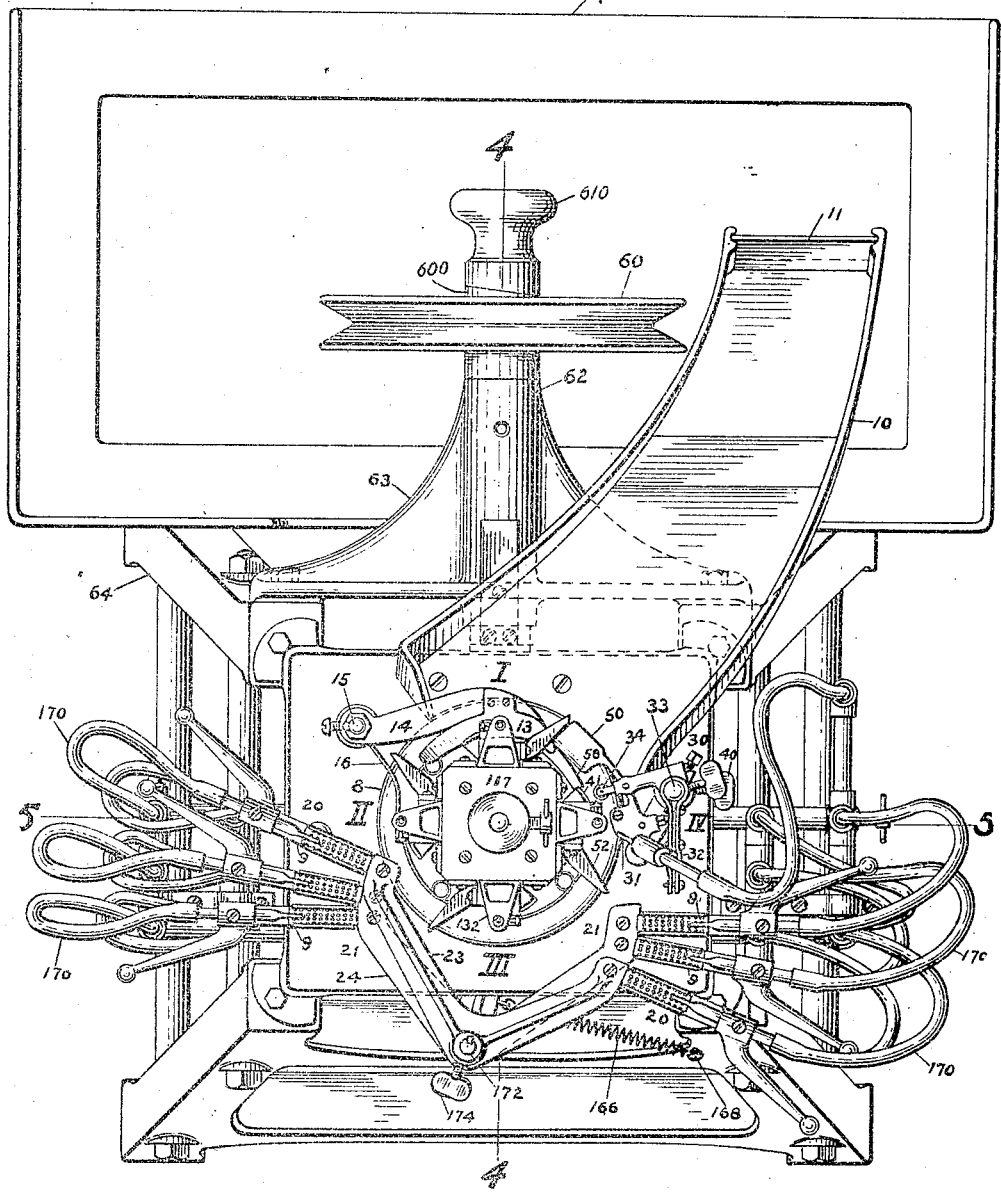
Figure 4:
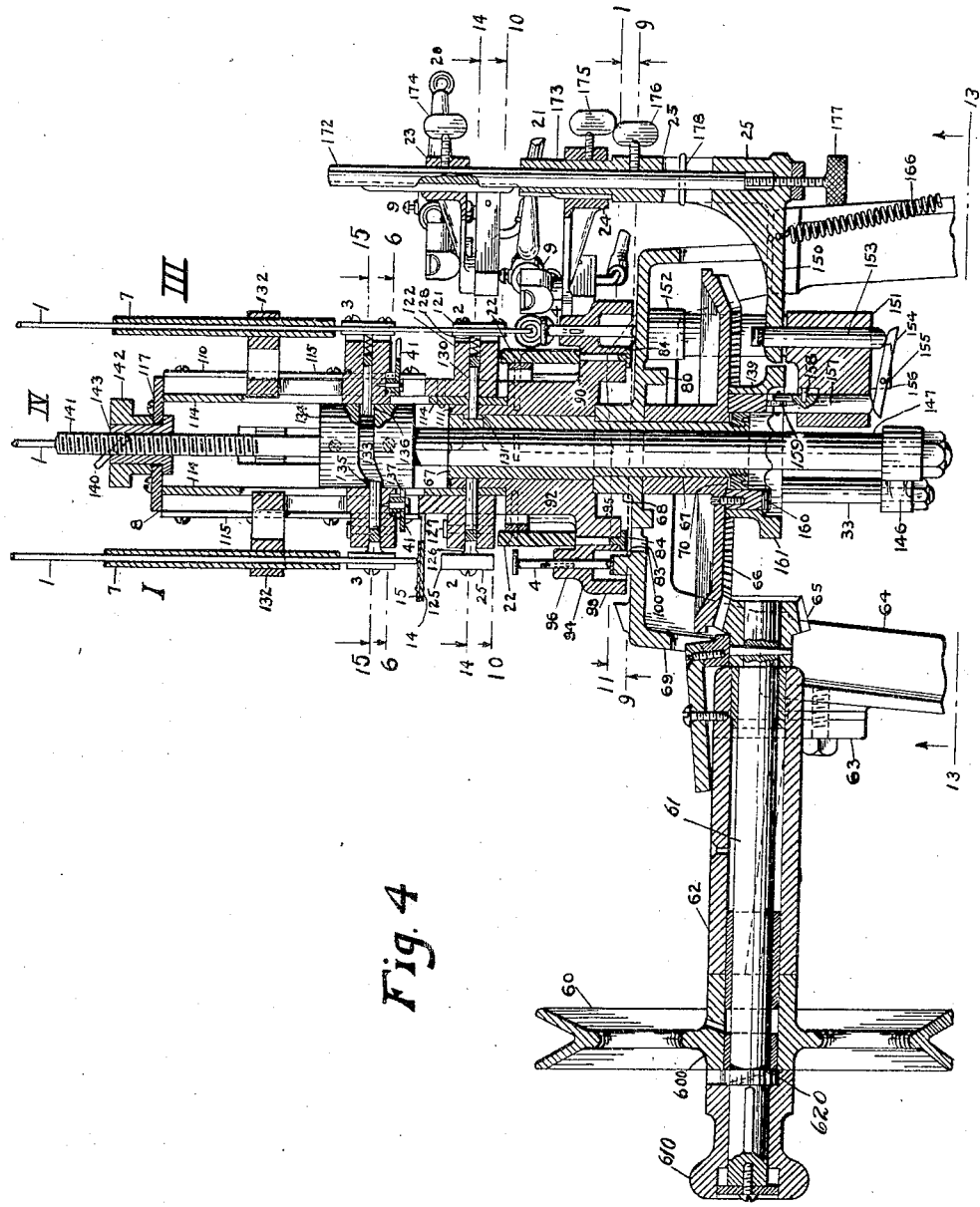
Figure 5:
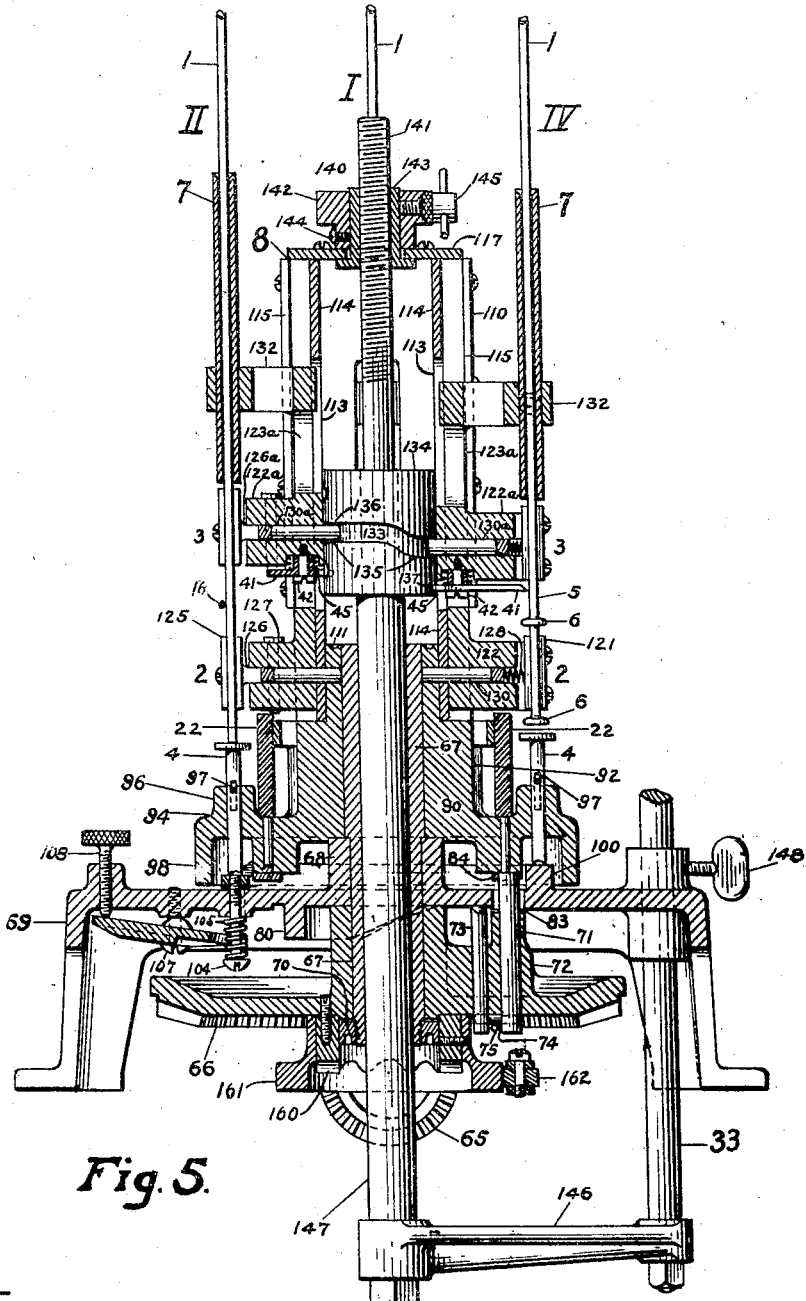
Figure 6:
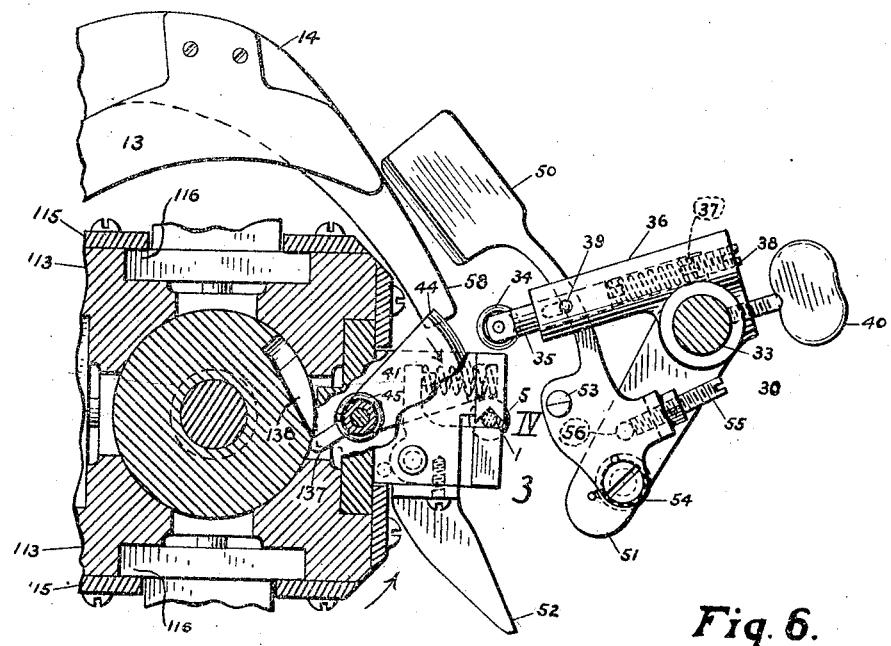
Figure 7:
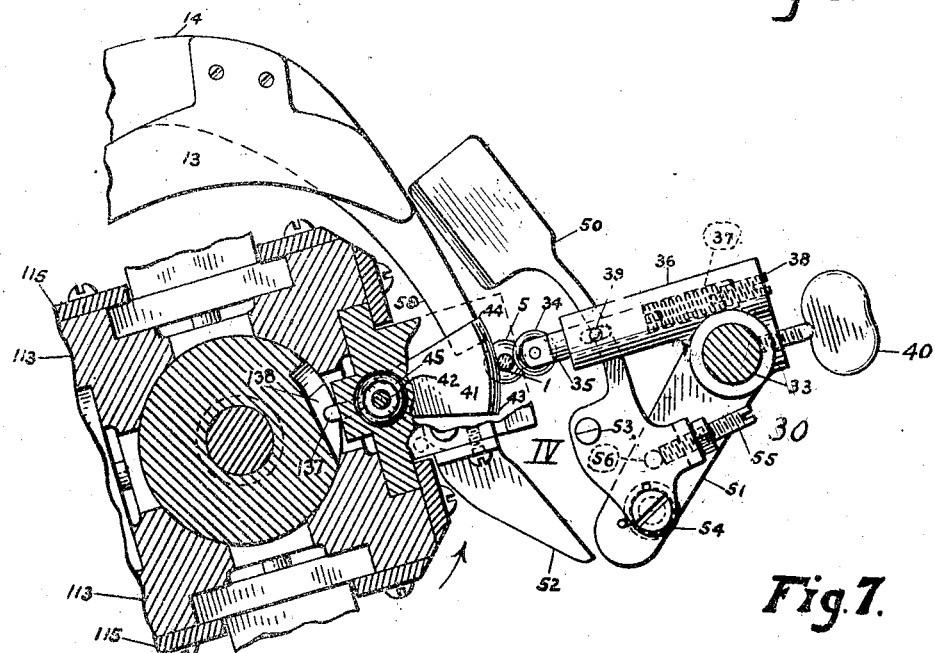
Figure 8:
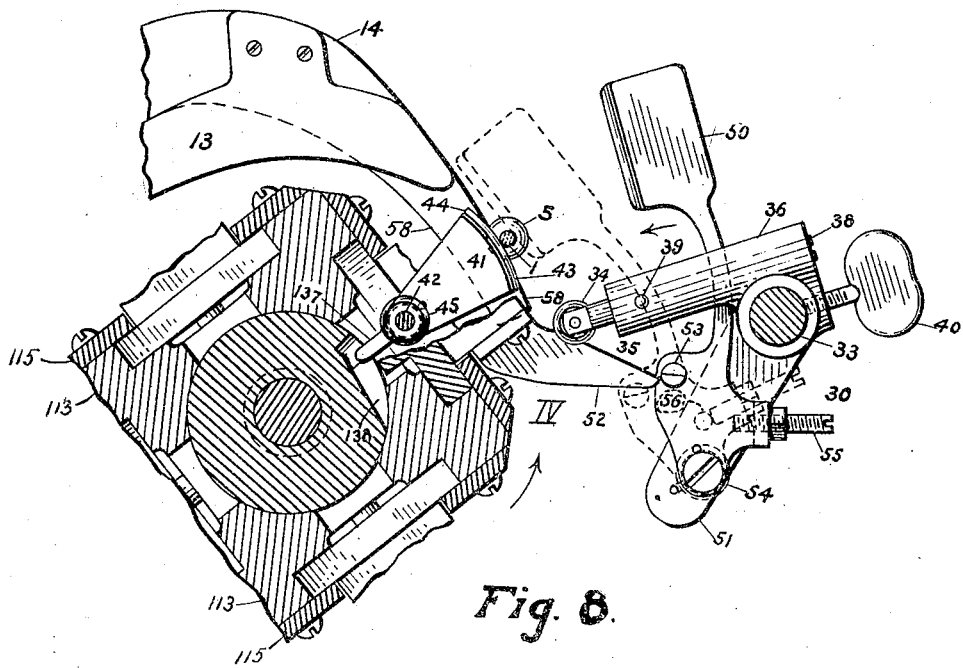
Figure 9:
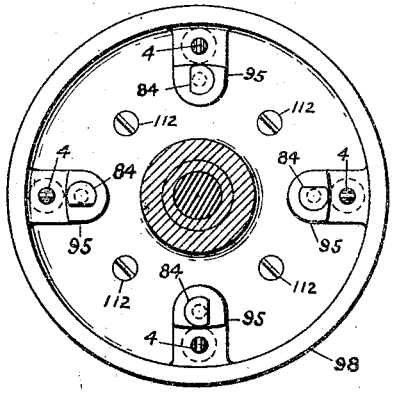
Figure 10:
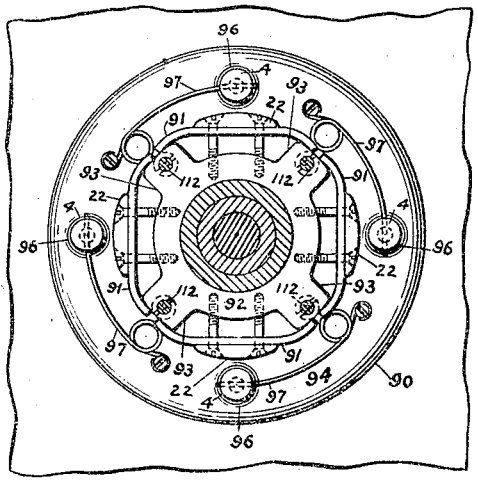
Figure 11:
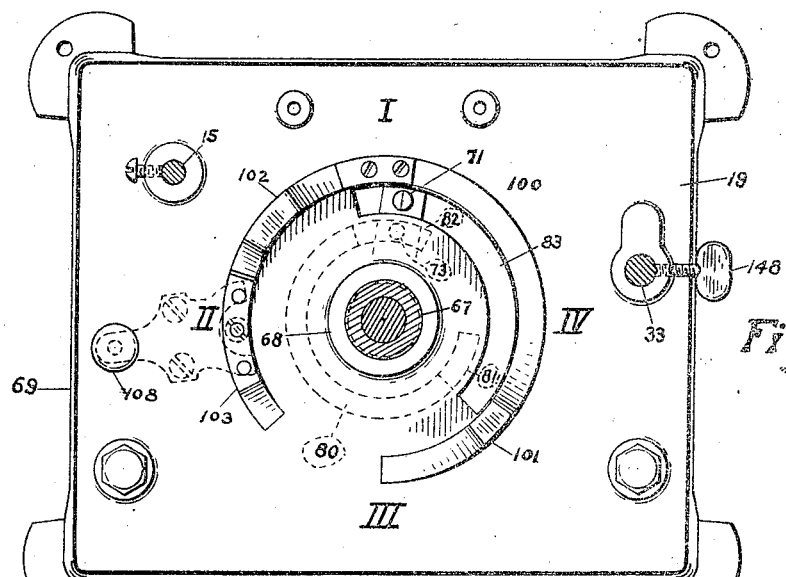
Figure 12:
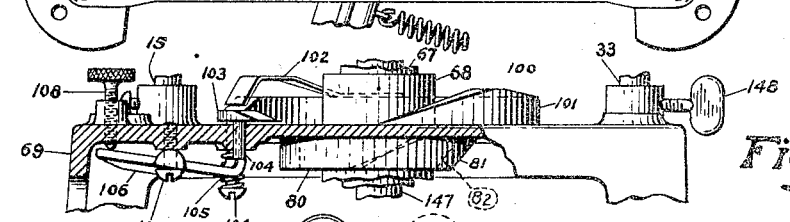
Figure 13:
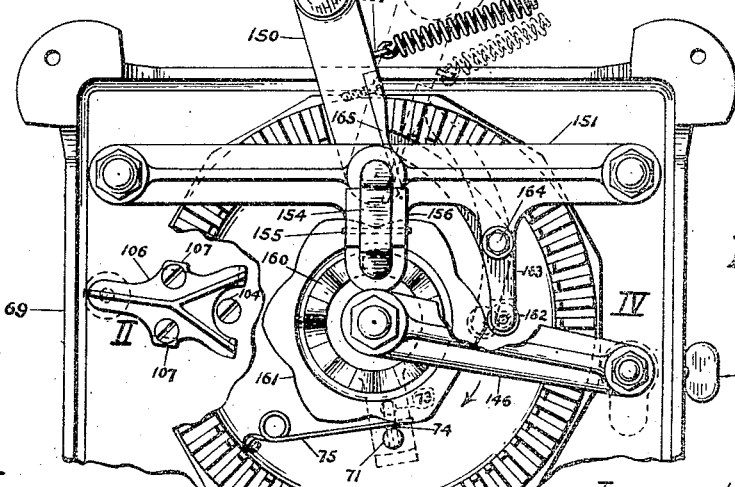
Figure 15:
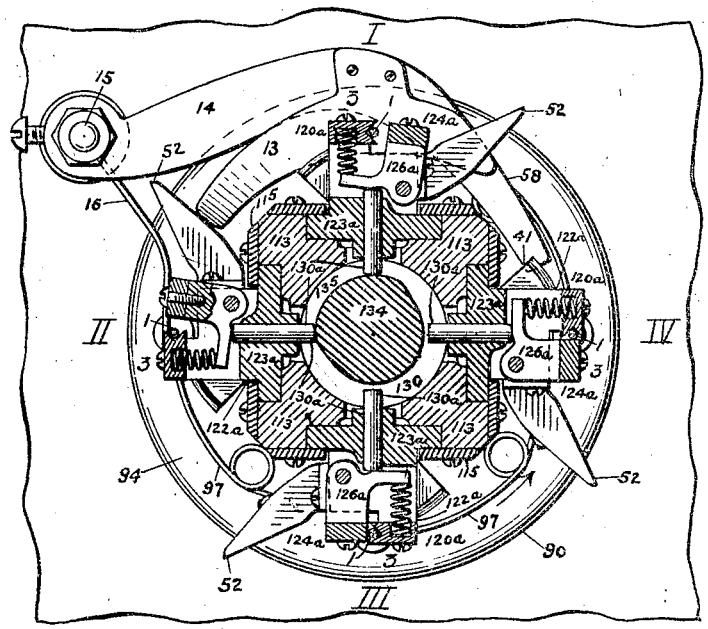
Figure 14:
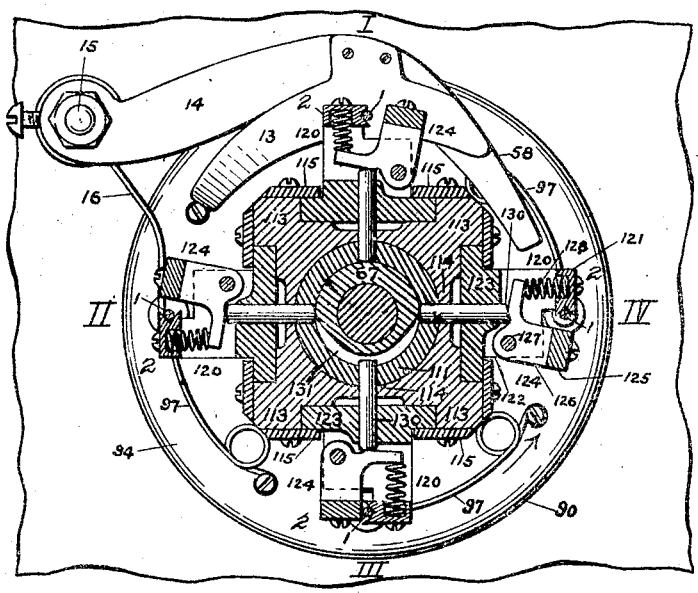

In the accompanying drawings, Figure 1 is a general view of the machine in elevation; Fig. 2 is a similar view from the right of Fig. 1; and Fig. 3 is a general plan view. Fig. 4 is a vertical section at a plane corresponding to the line 4—4 in Fig. 3; and Fig. 5 is a vertical section at a plane corresponding to the line 5—5 in Fig. 3, the principal parts of the machine being removed from the table or stand on which they are mounted and certain parts being broken away and omitted. Figs. 6, 7, and 8 are fragmentary views with certain parts in section on a plane corresponding to the line 6—6 in Fig. 4, these figures showing successive positions of the same parts during the operation of the machine and being upon a somewhat larger scale than the other views. Fig. 9 is a view looking upward from a plane of section corresponding to the line 9—9 in Fig. 4, certain parts being omitted; and Fig. 10 is a view looking downward at a plane of section corresponding to the line 10—10 in Fig. 4. Fig. 11 is a plan view with the parts in section at a plane corresponding to the line 11—11 of Fig. 4, the moving parts being omitted; Fig. 12 is an elevation showing the parts which appear in Fig. 11, the base or bed on which the machine is mounted being partly broken away; and Fig. 13 is a view from beneath, showing parts of the machine, some of which appear in section in Fig. 5, certain parts being broken away in order that others may be more clearly visible. Fig. 14 is a view looking downward from a plane of section corresponding to the line 14—14 in Fig. 4; and Fig. 15 is a similar view on a plane corresponding to the line 15—15.

I will first describe the action of the machine and its various parts upon the glass rods or tubes, setting forth the construction and arrangement of the parts and the manner in which they are brought into action only in so far as it can be done without rendering this description difficult to understand. I will then describe in detail the construction and arrangement of the various parts and mechanisms and the way in which they are brought into action and controlled. For convenience I shall hereinafter use the simple term "rod" as equally applicable both to a solid rod and to a hollow rod or tube.

The machine shown is adapted to receive and operate upon long glass rods and to produce and deliver a number of complete spider rods of the desired length from each rod received; but it is also capable of operating upon rods of the exact length required to make a spider rod,—in which case the operations by which portions of the proper length are detached from the long rods will naturally be dispensed with. As will be understood from Figs. 1, 2, 3, 4, and 5, and hereinafter more clearly and fully set forth, each rod 1 operated upon is fed lengthwise through holding means 2 adapted to close and grip it tightly or to open and release it. The rod is heated adjacent the holding means 2 so as to soften it, and while it is tightly held by the holding means 2 longitudinal pressure is exerted upon it so as to swell it out or expand it where heated. The means by relative movement between which and the holding means such longitudinal pressure is exerted upon the rod may be either an additional holding means 3 gripping it upon the opposite side of an intermediate heated portion from the holding means already mentioned or a part 4 pressed against the heated end of the rod. A portion 5 of the rod including one or more of the button-like enlargements 6 thus formed may be detached from the rest of the rod (if a length of rod more than sufficient for the production of a single completed spider rod 5 is being operated upon) after the formation of the buttons, and may be discharged from the holding means 2 by the opening of the device which has gripped such portion 5 wide enough to allow it to pass out sidewise. Any number of button-like enlargements 6 can be squeezed in the rod by the employment of a suitable number of properly actuated holding means or devices. I hereinafter describe the machine as equipped with two such holding devices 2 and 3 and also a part 4 adapted to press against the end of the rod, so that the machine is adapted for the production of spider rods with two buttons.

As will further be seen from Figs. 1, 2, 3, 4, and 5, a plurality of long glass rods 1 may be operated upon together, and they may be fed downward through guides 7 carried on a part or structure 8. The heating of the rods may be effected by a set of heating devices 9, the structure 8 and these devices being arranged so as to be capable of rotation with reference to one another so that the rods 1 shall successively be exposed to the heat. The various operations upon the rods 1 may be effected by holding means 2 and 3 and parts 4 provided on the structure 8 for each rod and by other means associated with the structure 8, and also by other parts or mechanisms besides the heating devices 9 between which and the structure 8 there is relative rotation. The revolving means may (as far as necessary) be brought into action by stationary means, and vice versa.

In the operation of the machine shown, the structure 8 revolves and carries each rod 1 a number of times through a cycle of operation comprising the downward feeding of the rod, local heating thereof where the buttons or enlargements 6 are to be formed, formation of the enlargements or buttons 6 by longitudinal pressure on the rod where heated, and cutting or breaking off of the portion 5 of the rod in which the buttons are formed, the detachment of this portion of the rod taking place, as shown, after the formation of the buttons and the other operations also taking place in the order in which they are here mentioned. The detached portions 5 of the rods 1 are finally delivered or ejected, and are conveniently received in an inclined trough 10 whose lower end is closed by a removable gate 11 and extends over a shelf 12 upon which may be placed trays or other receptacles for the shaped spider rods. As the rods 1 are used up, fresh ones will be inserted in the upper ends of the tubular guides 7, so that the working of the machine may go on without interruption.

The general downward feed of each rod 1 takes place periodically after the lower portion 5 of the rod on which the buttons 6 have been formed has been detached and allowed to drop into the trough 10, and may be produced by gravity alone. As will be seen from Figs. 3, 14, 15, and others, there is a part 13 mounted on an arm 14 vertically adjustable on an upright rod 15. After the cutting operation, the rotation of the part or structure 3 carries the lower end of the rod 1 (from which the portion 5 with the buttons 6 has just been detached) over the part 13 and the holding means 3 by which the upper portion of the rod 1 has been held and kept from dropping releases it (Fig. 9) and allows it to fall upon the springy sheet metal part 13, this taking place about as the rod is passing through the position shown at the right of Fig. 2 and marked "I" in the various views. While the portion of the part 13 on which the rod 1 first drops is more or less nearly horizontal, the left hand portion on to which it travels as the structure 8 revolves beyond the position I slopes downward, so that the rod 1 gradually feeds farther and farther downward till it travels off the incline, whereupon it drops freely through the open holding means 2 beneath the holding means 3 on to the part 4 beneath them both. By the time this part 4 has been carried by the revolution of the structure 8 into about the position II at the left of Figs. 1, 3, 5, 14, 15 and others, it has itself descended from the position which it occupied when the rod 1 dropped on to it. The downward movement of the rod 1 during this descent of the part 4 brings the rod 1 to the position shown at II in these figures and completes the feed of the rod for that cycle of operations. During the latter part of the travel and descent of a rod 1 as it approaches the position II it is ordinarily prevented from falling or moving too far outward by the guard 16 attached to the post 15, and so kept where it will be properly gripped by the holding means 2 when the latter subsequently closes; but if its length should be insufficient for the upper holding means 3 to get a grip on it, it will fall out of the machine at this time and the lower end of the rod above it will drop down into its place.

As the rod 1 travels with the part 8 from the position II to the position III, the holding means 2 already mentioned closes upon it and grips it below the point where the upper button 6 is to be formed, and the holding means 3 above the holding means 2 also closes and grips the rod above this point (see Figs. 4, 14 and 15), and the part 4 upon which its lower end (where the other button 6 is to be formed) has been resting recedes downward from beneath the lower end so as to leave this end freely exposed. The portions of the rod 1 where the buttons 6 are to be formed may after this readily be heated; and yet the rod is still so held that there is no danger of its becoming distorted. The heating is effected by the relatively stationary heating devices 9 already mentioned, the part 8 being arrested for a suitable period with the rod 1 in the position III while the heating is going on, if (as in the present instance is supposed to be the case) its rate of rotation is so rapid as to require this.

As will be seen from Figs. 1, 2, 3, and 4, the heating devices or burners 9 are mounted in two groups 20 and 21, and the flames from the heating devices of the upper group 20 play upon the portion of a rod 1 between the holding devices 2 and 3 where the upper button is to be formed and the flames from the heating devices of the group 21 play upon the lower end of the rod below the holding means 2 where the lower button is to be formed,—there being a refractory shield part 22 mounted on the structure 8 behind the lower end of the rod to receive the heat of the flames. As will also be seen from Figs. 1, 2, 3, and 4, the two groups of heating devices 20 and 21 are mounted on brackets 23 and 24 which are vertically and relatively adjustable on an upright supporting means 25 so that the rod 1 may be heated in just the right spots for any desired spacing and size of the buttons 6. To insure thorough, gradual, and even heating of the rod, provision may be made (as hereinafter described) for giving the supporting means 25 and the heating devices 9 carried by it a swinging movement back and forth with reference to the rod 1 and also an up and down movement. Of course during the dwell of the rod 1 under consideration in the position III the other three rods 1 will be halted (in the positions I, II, and IV hereinbefore and hereinafter referred to), so that the progress of the rods is intermittent and proceeds by a succession of quarter-turn steps.

When a rod 1 has remained in the position III long enough for the portions where the buttons are to be formed to become properly heated, the structure 8 resumes its movement and carries the rod around toward the position IV. During this movement the squeezing of the buttons 6 occurs. This, as shown, is effected by upward movement of the part 4 against the lower end of the rod to squeeze or form the lower button 6 and downward movement of the upper holding means 3 to squeeze the upper button 6, the holding means 2 remaining stationary. The formation of the buttons 6 on the rod 1 will thus have been completed by the time the rod reaches the position IV (see Fig. 1), and it will only remain to cut off a portion of the rod comprising the buttons so that at the proper time it may be delivered or drop into the trough 10. Prior to the severance of the rod the part 4 will preferably recede downward somewhat from the highest position to which it rises in the squeezing of the lower button, and the lower holding means 2 which grips the portion of the rod between the buttons 6 will release the rod and open wide enough to allow the rod to pass laterally out of it: as shown, both these events happen by the time the rod reaches the position IV. The severance may advantageously be effected during the travel of the rod from the position IV around to the position I by relatively stationary cutting means 30 (Figs. 2, 3, 6, 7, and 8) suitably located in the path of the rod. As the cutting means shown acts by scratching and breaking, a nozzle 31 is mounted on a bracket 32 adjustably clamped on a supporting member or standard 33 so that at the position IV the part of the rod 1 above the upper button 6 where it is to be cut, will be chilled by a jet of air or the like directed on it from this nozzle sufficiently to make it hard enough for scratching and breaking. As shown in Figs. 2, 3, 6, 7, and 8, the scratching means comprises a sharp edged wheel 34 mounted on the end of a plunger or rod 35 which slides in a barrel or bore in a bracket 36 and is urged outward by a helical spring 37. A screw 38 at the rear end of the bore serves as an adjustable abutment by which the force with which the plunger 35 is urged outward may be regulated and a pin 39 in the outer end of the bracket 36 extending through an elongated hole in the plunger 35 limits the outward movement of the plunger under the influence of the spring 37 and also allows the wheel 34 to be forced back by the glass rod 1 so that it shall pass over an arc of the circumference of the rod and not merely touch it at a mere point. The bracket 36 is itself mounted on the vertical rod or standard 33 above referred to and secured in properly adjusted position by a set screw 40. As the rod leaves the position IV (Fig. 13) and approaches the wheel 34, a part 41 having a curved outer edge whose radial distance from the pivot 42 gradually increases from the front corner 43 to the rear corner 44 (see also Fig. 5) is allowed to swing around behind it under the action of a spring 45. (The influence of this spring 45 is ordinarily resisted so that the part 41 remains in the position indicated at the right of Fig. 5, where it is out of the way.) This part 41 engages the rod 1 just opposite the wheel 34 so as to sustain and steady it as it passes the wheel better than the holding means 3 (which is still closed) could alone do, and thus insure that it shall be properly scratched by the wheel 34 (Fig. 7) without breakage in the wrong place. After the glass rod has thus been scratched, the breaking means comes into action to give it a sharp blow and break it off. As shown, the breaking means comprises a spring actuated arm 50 pivoted on an arm 51 of the bracket 36. In the revolution of the structure 8 after the scratching means has acted, a part 52 carried by the structure 8 engages a pin 53 on the arm 50, thus forcing the arm 50 back against the resistance of its spring 54 to the outermost position shown in Fig. 8. Immediately after this the end of the part 52 trips past the pin 53, which allows the arm 50 to swing back under the action of its spring 54 so that its relatively heavy outer end shall deliver a sharp blow against the glass rod 1 just beneath the scratch made by the roller 34 (the part 41 still being in contact with the rod), which will break it off. After delivering this blow the arm 50 will come to rest in its normal position shown in Figs. 6 and 7 with the end of the adjustable screw 55 which lies on the lower side of the arm against the pin 56 which projects upward from the upper side of the bracket 51.

It will be observed that when the blow of the arm 50 is delivered the part of the rod below that struck is opposite a prolongation 58 of the part 14 already referred to, the outer edge of this part 14 sloping farther and farther outward from the axis of the structure 8 from its end 58 nearest the position IV toward the position I. This portion of the part 14 initially serves to prevent the detached portion 5 of the rod 1 from falling inward toward the structure 8; and as the structure 8 carries the rod 1 on around toward the position I the part 14 pushes it laterally out of the holding means 2 and throws it clear of the structure 8 so that it may drop directly into the trough 10.

During the operations just described the upper holding means 3 has been closed, and it remains closed and holds the upper part of the rod 1 until the portion 5 having the buttons 6 has been detached and the lower end of the upper portion has come over the part 13. About this time the part 41 is caused to swing back out of the way. Presently the holding means 3 opens, as above described, and allows the rod 1 to drop on the part 13 again, and the cycle of operations upon it begins anew.

Having thus described the action of the machine and its various parts upon the rods, I will now proceed to describe in detail the structure of the machine and the arrangements of its various parts, and also the manner in which they are made to operate as described.

Power for the rotation of the structure 3 and the accomplishment of the various operations is, as shown in Figs. 2, 3, and 4, supplied through a pulley 60 loosely mounted on a shaft 61 which has its bearings in a sleeve 62 of a bracket 63 bolted to the stand or supporting frame 64. A knob 610 splined on the shaft 61 has engaging faces 620 which can be engaged with corresponding faces on the hub 600 of the pulley to cause the shaft 61 to revolve with the pulley and drive the machine or disengaged to allow the shaft 61 and the machine to come to rest by merely moving the knob 610 endwise. Keyed to the inner end of the shaft 61 (as shown in Fig. 4) is a beveled pinion 65 which meshes with a beveled gear 66 (see Fig. 13). This gear 66 revolves in the direction indicated by the arrow, (Fig. 13) and about the lower portion of a stationary sleeve 67 mounted in a hollow boss 68 on the base 69 of the machine, a ring or collar 70 being threaded on the lower end of the sleeve 67. The structure 8, which is mounted on the upper portion of the sleeve 67 coaxially with the gear 66 and rests on the upper end of the hollow boss 68, is intermittently connected with the gear 66 at suitable intervals so as to give the structure 8 a quarter turn and take one of the rods 1 out of the range of the heating means 9 after it has dwelt there a sufficient time and bring another rod into the position III to be heated. From the gear 66 also, motion is transmitted for giving the heating means 9 the up and down and back and forth movement already referred to. The manner in which the continuously revolving gear 66 is thus intermittently connected with the part or structure 8 will be seen from Figs. 4, 5, 9, 10, 11, 12, and 13. As here shown, the gear 66 carries movable engagement means comprising a rod or pin 71 which slides in a bore in a suitably formed portion 72 of the web of gear 66 adjacent its hub, and is actuated at the proper time through a rod or pin 73 in an adjacent bore, the lower ends of these pins 71 and 73 being secured together by a transverse coupling piece or pin 74, and the pins being urged upward by a spring 75 (Fig. 13). On the lower side of the base 69 there is a cam projection 80 of circular form having inclined ends 81 and 82 and a substantially level intermediate portion. During the greater part of each revolution of the gear 66 the upper end of the rod 73 rides on this cam 80 and the upper end of the rod or catch 71 is thus kept depressed below the lower side of the base 69, and the structure 8 is thus disconnected from the gear 66 and at rest. When, however, the rod 73 reaches the upwardly sloping end 81 of the cam 80, the catch 71 is allowed to rise through a curved slot 83 in the base 69 which overlaps the sloping cam portion 81. By the time the catch 71 gets to about the position III (Fig. 11) it will have risen far enough for its flattened end portion to engage the flat side of the one of four catches 84 on the lower side of the structure 8 (Fig. 9) that happens to have been left in this position when the part or structure 8 came to rest after its last preceding movement (see Fig. 5), and the structure 8 will thus be put in motion and carried around with the gear 66. This movement of the structure 8 will continue until the upper end of the rod 73 encounters the downwardly sloping cam portion 82 and the catch 71 is thus depressed far enough to release the catch 84 with which it is engaged and allow the part 8 to come to rest again. Complete stoppage of the structure 8 may be hastened by the employment of a friction device such as will hereinafter be described, and will be arranged to happen after it has moved one fourth of a complete revolution. Thus the structure 8 will be revolved one quarter turn during each complete revolution of the gear 66 and will remain stationary during the remaining three quarters of a revolution. The catches 84 will advantageously not be integral with the body of the structure 8, but will be made separate as indicated in Figs. 4 and 5, so that they may consist of material of suitable wearing properties and may be replaced from time to time.

The conformation and construction of the lower part 90 of the structure 8 in which the sleeve 67 has its bearing (as above described) will best be seen from Figs. 4, 5, 9, and 10. As here shown, the vertical shields 22 which receive the heat of the flames by which the lower ends of the rods 1 are softened are secured by screws which pass through bridge pieces 91 (Fig. 10) and enter the intermediate portion 92 of the part 90. The ends of these bridge pieces 91 rest against outwardly projecting portions 93 of the part 90 so that the air has access behind the shields 22 to cool them. A circular flange 94 at the lower end of the part 90 has on its lower side projections 95 which carry the four catches 84 already referred to. On the upper side of the flange 94 are protuberances 96 having in them vertical bores which extend clear through to the lower side of the flange 94 and in which slide the parts 4 by which the buttons 6 at the lower ends of the rods 1 are formed. These parts 4 are yieldingly pressed downward by wire springs 97 secured to the upper side of the flange 94 by screws and extending through grooves or slots in the protuberances 96 into holes in the parts 4, as best shown in Figs. 5 and 10. While the lower surface of the flange 94 as a whole is considerably above the upper side of the base 69, it has at its outer edge a rim 98 which extends downward close to the base 69 so as to inclose the operating parts between the upper side of the base 69 and the lower side of the part 90.

The upward and downward motion of the parts 4 is produced by the action of cam means 100 at the upper side of the base 69 on their lower ends, as best shown in Figs. 4, 5, 11, and 12. As will be seen from Fig. 11, the cam means in question comprises parts 101, 102 and 103 of varying height which extend from the position III more than three-quarters of a complete circle around beyond the position II. The part forming the highest portion of this cam means is the spring part 102 secured to the upper side of the part 101 and extending from a little beyond the position I nearly to the position II. The highest part of this spring is about level and rubs against the lower surface of the flange 94, thus forming the friction device above referred to by which the structure 8 is promptly brought to rest after it is disconnected from the continuously rotating gear 66. When the lower end of one of the parts 4 is on the highest part of the spring 102, it is in its most elevated position where its upper end receives the lower end of the corresponding rod 1 as this rod drops off the lower end of the inclined member 13, and the resiliency of the spring 102 serves to cushion the shock of this impact and so protect the rod 1 from breakage. When the lower end of the part 4 passes from the spring 102 on to the horizontal surface of the cam portion 103 about at the position II, the downward feed of the rod 1 is so completed. When the lower end of the part 4 passes on beyond the position II and rides down and off the sloping end of the cam portion 103, the part 4 recedes from beneath the end of the rod 1 and reaches the position of greatest depression which it continues to occupy until after the rod 1 has been heated at the position III. As the structure 8 resumes its motion and carries the part 4 around against the upwardly inclined end of the fixed cam portion 101, the part 4 is raised to squeeze the button 6 on the lower end of the rod 1, reaching its greatest elevation about midway between the positions III and IV and subsequently descending so as to leave the formed spider rod free to be broken off and discharged.

The elevation of the upper surface of the cam portion 103 and the downward feed of the glass rod 1, which is controlled thereby, can be regulated by raising and lowering this cam portion. As will be see from Figs. 11, 12, and 13, this cam portion 103 is attached to a plurality of pins 104 which slide in holes in the base 69. The middle pin is a screw between the head of which and the lower side of the base 69 is a spiral spring 105 which acts to depress the cam portion 103. A rocker arm 106 is fulcrumed at the lower side of the base 69 on the heads 107 of two screws which pass through holes in the rocker arm, and the forked ends of this rocker arm 106 bear on the two outside pins 104 while its other end bears against the lower end of the adjusting screw 108 which extends to the upper side of the base 69 and serves as a convenient means for raising and lowering the cam portion 103.

At the upper end of the part 90 is secured a cylindrically hollow frame-like structure 110 the lower end of which fits about the cylindrical upper end portion 111 of the part 90 and is secured by long screws 112 (Figs. 9 and 10) which extend upward from the lower side of the part 90 through holes in the portions 93 into threaded holes in the lower end of the structure 110. The frame work 110 may in a general way be described as consisting of four upright members or posts 113 (see Figs. 6, 7, 8, 14 and 15) and webs 114 connecting them. The uprights 113 have a cross-section such that when strips 115 are secured to them by screws as shown in Figs. 1, 2, 4, 5, 14, and 15, grooves 116 are formed at their adjacent edges, these grooves extending clear from the upper side of the intermediate portion 92 of the part 90 to the lower side of a plate 117 screwed to the upper ends of the members 113 as shown in Figs. 3, 4, and 5.

The holding means 2 and 3 above referred to are mounted in the grooves 116 of the members 113 as well as the tubular guides or holders 7. The lower holding means 2 are (as shown in Figs. 1, 2, 4, and 5,) located just above the shields 22. From Figs. 4, 5, and 14 it will be seen that each of the holding means 2 comprises a fixed jaw 120 having an acting part 121 secured by screws to a part 122 which has a T head or base portion 123 which fits in the grooves 116 of the members 113, the jaw portion 121 having a vertical groove in its acting face. The movable jaw 124 which co-acts with each fixed jaw 120 comprises a part 125 having a flat acting or gripping face and attached by a screw to the rocker portion 126 vertically pivoted at 127 in a horizontal slot in the part 122. A helical spring 128 is mounted between the heel of the rocker portion 126 and the opposite side of the fixed jaw portion 121, this spring entering a recess in the part 121 and fitting over a pin-like projection on the heel of the rocker 126, so that the jaws constantly tend to close and grip the rod 1. A pin 130 extends through a hole in the T-head 123 of the part 122 and through a corresponding hole in the lower web 114 of the structure 110, and on through a corresponding hole in the upper end portion 111 of the part 90 to the stationary sleeve 67. The outer end of this pin 130 bears against the heel of the rocker 126, while its inner end bears against the upper portion of the sleeve 67. As will be seen from Figs. 4 and 14, there is a horizontal groove 131 in the cylindrical part 67 and this groove extends approximately from the position II around past the position III to the position IV. It will readily be seen that as the structure 8 revolves the lower holding means 2 will by the action of the cam thus provided on the part 67 be caused to close and grip each rod 1 after it has left the position II and been fed downward by its weight on to and with the descending part 4; to remain closed until after the rod 1 has passed through the position III and been heated; and then to open about as the rod 1 reaches the position IV preparatory to the breaking off of the finished spider rod 5, as hereinbefore described.

As will be seen from Figs. 1, 2, 3, 4, and 5, the tubular guides 7 are in the construction shown secured above the upper holding means 3 by set screws in arms 132 projecting outward from the T-head portions 123ᵃ associated with the upper holding means 3, so that the tubes 7 follow the upward and downward movement of the holding means 3. The parts 41 are pivoted at the lower sides of the parts 122ᵃ so that they likewise move up and down with the holding means 3. The holding means 3 comprise jaws 120ᵃ and 124ᵃ just like those of the holding means 2 above described and are actuated in a similar manner through pins 130ᵃ which extend from the heels of the rocker portions 126ᵃ of the jaws through holes in the parts 123ᵃ and between the adjacent edges of the members 113 into a groove 133 in a relatively stationary cam member 134 mounted in the cylindrical interior of the frame structure 110 (Figs. 4 and 5). This groove 133 varies in depth as shown in Fig. 15, comprising a relatively shallow portion 135 extending from a little to the right of the position I around to about the position II and a relatively deep portion 136 extending from about the position II around nearly to the position I. It is by the action of the cam surface at the bottom of the groove 133 that each of the upper holding means 3 is caused to be open during its travel with the revolving structure 8 from the position I to about the position II while the rod 1 is feeding downward and to close and grip the rod 1 and remain closed during the heating, squeezing, and breaking operations which occur while it is traveling from about the position II on beyond the position IV.

From Figs. 4 and 5 it will further be seen that the groove 133 in the cam 134 does not lie at one level throughout its entire extent, but comprises a higher portion which extends from about the position II around to the position III and a lower portion which extends from about the position III around past the position IV a little beyond the position I, these portions of the groove being connected by inclined portions as shown. By the action of the sides of the groove on the inner ends of the pins 130ª each of the upper holding means 3 is caused to move downward as the rod 1 travels from the position III toward the position IV to squeeze the upper button 6 between it and the stationary holding means 2 and then to rise again about at the position I after the formed spider rod 5 has been broken off and discharged, so as to be ready to take a fresh grip upon the rod 1 preparatory to the squeezing of another button. The inner end 137 of each part 41 travels on the cylindrical surface of the member 134 below the groove 133 during the greater part of each revolution of the structure 8, this being the way in which the part 41 is held back out of the way; but about as the arm-holding means 3 with which each part 41 is associated passes beyond the position IV the inner end 137 enters a groove 138 extending a short distance around the circumference of the part 134, so that the part 41 is caused or allowed to swing outward against the rod 1 and assist in the scratching and breaking operations, as above described.

To provide for variations in the spacing of the upper and lower buttons and to permit greater variations in the length of the completed spider rod than could be obtained by merely varying the feed of the rod in the manner above described, the cam member 134 is made vertically adjustable so as to vary the height above the holding means 2 at which the holding means 3 take hold upon the rod and the parts 41 engage them, and also so allow the distance above the holding means 2 of the portion of the rod that is heated to be varied. As shown in Figs. 3, 4, and 5, the adjustment is effected by revolving a nut 140 which has a bearing on the part 117 at the top of the structure 110 and engages a threaded rod 141 which extends upward from the member 134. This nut 140 consists of an outer portion 142 and an inner portion 143 secured together by a set-screw 144. By tightening a screw 145 threaded through a strong flange at the upper end of the outer part 142 the inner part 143 can be made to grip the threaded rod 141 and prevent accidental movement of the nut. To facilitate the adjustment of the machine for spider rods of different length, the lower end of the part 33 which carries the scratching and breaking means is connected by a part 146 below the gear 66 with the lower end of a rod 147 which extends down from the part 134 through the hollow sleeve 67, so that when the height of the part 134 and the range of movement of the holding means 3 and the parts 41 is changed the height of the scratching and breaking means will be correspondingly changed without any special care except the loosening and tightening of the screw 148.

I will now describe how heating devices 9 are mounted, and also how they are given the movement heretofore referred to to insure the best results in the heating of the rods.

The supporting-means 25 by which the heating devices are carried is, as shown in Figs. 1, 2, 3, 4, 5, and 13, mounted on an arm 150 which is supported on a yoke or beam 151 extending beneath the base 69 and supported from its lower side by two downwardly extending posts 152. The inner end of the arm 150 is, as shown, secured on a pin 153 which extends vertically through a bore in the part 151. The lower end of this pin 153 engages one end of a lever 154 pivoted at 155 between lugs 156 on the lower side of the part 151, and the other end of this lever 154 engages the lower end of a pin 157 which slides in a bore in the part 151, a small pin 158 in one side of this pin 157 sliding in a groove in the part 151 and so keeping the pin 157 from turning. In the upper end of the pin 157 is pivoted a roller 159 which engages with a circular cam 160 secured on the lower side of the gear 66 by a suitable number of screws. The acting end or face of this cam 160 has a wavy outline, as shown in Figs. 4 and 5, so that as the gear 66 revolves it acts through the parts just described to give the support 25 a continual up and down movement. On the lower side of the gear 66 is also mounted a cam 161, which as shown in Fig. 5 fits around the cam 160 and is secured by a screw. This cam 161 has a wavy outline shown in Fig. 13. The circumference of this cam acts through a roller 162 on one end of a lever 163 pivoted at 164 on the part 151. The other end of this lever 163 is curved and bears against a suitably shaped wearing part 165 at one side of the arm 150 on which the supporting means 25 is mounted. A spring 166 is stretched between an eye 167 on the part 150 and a screw 168 on the frame 64 of the machine, and tends to pull the part 150 to the right (Figs. 1 and 3.) As the gear 66 and the cam 161 revolve, therefore, the arm 150 with the supporting means 25 and both groups 20 and 21 of heating devices are continually swung back and forth.

The upper heating means 20 comprises a pair of burners 9 mounted opposite one another on the brackets 23 above mentioned and supplied with gas and air through flexible tubing 170, piping 171, and suitable valves, etc., (Figs. 1, 2, 3, and 4.) The lower heating means 21 comprises two pairs of burners 9 mounted opposite one another so that their flames converge upon the lower end of the glass rod 1 exposed to them. These burners 9 are similarly mounted on a bracket 24, as above mentioned. Provision is made for vertical adjustment of the upper and lower sets of burners, both together and with reference to one another. As shown in Fig. 4, the bracket 23 on which the heating device of the upper set 20 are carried slides on the rod 172 and is prevented from turning about it by a suitable key. The bracket 24 on which the lower set of heating devices are mounted is similarly slidable on a sleeve 173 and is kept from turning about it by similar means. Screws 174 and 175 enable the brackets 23 and 24 to be secured at their desired vertical positions on the parts 172 and 173, and another screw 176 enables the rod 172 to be secured in its desired vertical position in the part 173. A screw 177 furnishes a convenient means for bringing the rod 172 to the desired vertical adjustment with respect to the sleeve 173; and a pin 178 (the middle of which lies in a hole in the rod 172 and the ends of which extend into a slot in the sleeve 173) prevents the rod 172 and the sleeve 173 from turning with reference to one another.

What I claim as new and desire to secure by Letters Patent of the United States, is:

1. The combination of adjacent holding means through which a length of glass rod may be fed longitudinally, means for heating the portion of the rod between said holding means, means for causing said holding means to approach one another in the longitudinal direction of the rod so as to expand the heated portion and produce an enlargement of the rod, and means for cutting the rod between said holding means so as to include said enlargement in the portion detached.

2. The combination of means for causing a rod to be intermittently fed longitudinally a definite distance, holding means adapted to open to allow the feeding of the rod and to close and grip the rod after the feeding has taken place, means for heating the rod on opposite sides of said holding means, means for exerting longitudinal pressure upon the heated portions of the rod to expand them into enlargements, and means for severing from the rest of the rod a definite length including the enlargements thus formed.

3. The combination of a plurality of holding means adapted to allow a glass rod to be fed through them lengthwise when open and to close and grip the rod, means for heating the portion of the rod between said holding means, means for bringing said holding means closer together to expand the heated portion of the rod into an enlargement, means for cutting the rod between said holding means to detach the portion in which the enlargement has been formed, and means for discharging the detached portion of the rod sidewise from said holding means.

4. The combination of a revoluble structure adapted to carry a plurality of glass rods and comprising holding means for each rod through which it is fed longitudinally a definite distance during the revolution of the structure, heating means within the action of which each rod is brought during each revolution of the structure so as to be heated adjacent said holding means, means which by the rotation of the structure is caused to act lengthwise upon the rod where heated to expand it, and means brought into action by the rotation of the structure to detach a portion of the rod including the enlargement thus produced.

5. The combination of a rotating structure carrying a plurality of holding means for each of a plurality of glass rods through which the rods may feed lengthwise, means co-acting with said holding means to cause each rod to be fed lengthwise therethrough a definite distance during each revolution of the structure, heating means adapted to heat the portion of each rod between two of the holding means therefor and also its end portion during the revolution of the structure, means brought into action by the revolution to cause the holding means for each rod to grip the same and to approach each other to expand and enlarge the heated portion of the rod between them, means for exerting longitudinal pressure upon the heated end of the rod to expand and enlarge it, and means for subsequently detaching a definite length of the rod comprising the enlargements thus produced.

6. The combination of a rotating structure carrying holding means for a plurality of glass rods through which they are fed longitudinally a definite distance during each revolution of the structure, means for heating a portion of each rod intermediate two separate holding devices comprised in the holding means therefor and for heating its end, relatively stationary means caused by the rotation of the structure to act upon said holding means to open and close same and to move the holding devices for each rod in its longitudinal direction toward one another to expand and enlarge the heated portion between them, means also actuated by a relatively stationary part for exerting longitudinal pressure upon the heated ends of the rods to enlarge them, and means for intermittently rotating said structure so as to cause each rod to dwell for a suitable length of time within the influence of said heating means and carry the rods through the operations described.

7. The combination of a structure mounted for rotation about a vertical axis and carrying jaws for holding a plurality of glass rods, there being for each rod a plurality of sets of such jaws arranged vertically one above another and relatively movable in a vertical direction through which the rod can be fed lengthwise by gravity when they are open, and the sets of jaws for each rod being opened to allow the rod to descend by gravity a definite distance during a certain portion of each revolution of the structure and closing after its downward movement, a vertical movable part beneath each rod upon which it rests at the end of its downward movement, relatively stationary heating means mounted in proximity to the rotating structure, means for intermittently rotating the structure so as to bring the various rods successively into a position to be heated and allow them to remain there a sufficient time for the portions between the sets of jaws and the ends below the lower set of jaws to be heated, means which by the rotation of said structure is caused to act upon said vertically movable part beneath the lower end of the rod to produce a downward movement thereof after the jaws have closed so as to leave the lower end of the rod exposed to the action of the heating means and to produce an upward movement thereof when the structure resumes its movement after the heating so as to expand and enlarge the lower end of the rod, means for also causing the sets of jaws to come closer together after the heating to expand the heated portion of the rod between them and thereafter opening the lower set of jaws, means acting upon the rod during its subsequent travel with the structure to sever it between the sets of jaws and above the enlargement formed on it between them, and means for discharging the detached portion of the rod sidewise from the lower set of jaws.

8. The combination of a plurality of means for gripping a glass rod and holding the same in a substantially vertical position, means for heating a portion of the rod between said gripping means to soften it, means for causing said gripping means to approach one another to exert longitudinal pressure on the softened portion of the rod and so enlarge it, and means for ejecting the said rod sidewise from the said gripping means.

In witness whereof, I have hereunto set my hand this eighteenth day of June, 1912.

ALFRED LA FRANCE.

Witnesses:
 HERMANN A. GREINER,
 ALVIN C. SEIFERT.